US007636852B1

(12) United States Patent
Balasubramanian et al.

(10) Patent No.: US 7,636,852 B1
(45) Date of Patent: Dec. 22, 2009

(54) CALL CENTER DASHBOARD

(75) Inventors: Balagurunathan Balasubramanian, Irving, TX (US); Rudi Himawan, Grand Prairie, TX (US); Hemanth Jayaraman, Allen, TX (US); Bharath N. Kuruvalli, Irving, TX (US); Stephen L. Marshall, Ennis, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 788 days.

(21) Appl. No.: 10/960,535

(22) Filed: Oct. 7, 2004

(51) Int. Cl.
*G06F 21/00* (2006.01)
(52) U.S. Cl. ...................... 713/183; 713/182
(58) Field of Classification Search ................ 713/202
See application file for complete search history.

(56) References Cited

U.S. PATENT DOCUMENTS

| | | | | |
|---|---|---|---|---|
| 5,293,488 | A * | 3/1994 | Riley et al. | 709/244 |
| 5,659,547 | A * | 8/1997 | Scarr et al. | 714/4 |
| 5,742,668 | A | 4/1998 | Pepe et al. | |
| 5,742,905 | A | 4/1998 | Pepe et al. | |
| 6,009,177 | A * | 12/1999 | Sudia | 713/191 |
| 6,240,512 | B1 * | 5/2001 | Fang et al. | 713/150 |
| 6,321,334 | B1 * | 11/2001 | Jerger et al. | 726/1 |
| 6,519,647 | B1 * | 2/2003 | Howard et al. | 709/229 |
| 6,609,115 | B1 | 8/2003 | Mehring et al. | 705/51 |
| 6,836,799 | B1 * | 12/2004 | Philyaw et al. | 709/224 |
| 6,898,577 | B1 * | 5/2005 | Johnson | 705/51 |
| 7,016,875 | B1 * | 3/2006 | Steele et al. | 705/44 |
| 7,089,585 | B1 * | 8/2006 | Dharmarajan | 726/8 |
| 7,194,764 | B2 | 3/2007 | Martherus et al. | |
| 7,350,229 | B1 * | 3/2008 | Lander | 726/8 |
| 2002/0091639 | A1 | 7/2002 | Mandahl et al. | |
| 2003/0120593 | A1 | 6/2003 | Bansal et al. | |
| 2004/0034594 | A1 | 2/2004 | Thomas et al. | |
| 2004/0117386 | A1 | 6/2004 | Lavender et al. | |
| 2004/0148565 | A1 * | 7/2004 | Davis et al. | 715/501.1 |

OTHER PUBLICATIONS

Citrix, "Citrix MetaFrame Password Manager," Apr. 22, 2004.*
Citrix, Access on demand enterprise, "Citrix Metal Frame Password Manager," Publication date: Apr. 22, 2004.*
Citrix Systems, *Citrix MetaFrame Password Manager*, Apr. 22, 2004, 1 page.
Boydstun, Ken, *Security Framework Bridge*, Filing Date—Oct. 31, 2002, U.S. Appl. No. 10/284,680, Specification (45 pgs.), Drawings (3 sheets).

(Continued)

*Primary Examiner*—Kambiz Zand
*Assistant Examiner*—Dant B Shaifer Harriman

(57) ABSTRACT

A password management system is provided. The password management system includes a plurality of enterprise applications accessible by local and remote desktop computers by providing single sign-on security information. Each of the plurality of enterprise applications require separate login information which is stored in a secure back-end system along with the single sign-on security information. Scripts located, for example, on remotely accessible servers and/or on the local desktop computer, allow a user to logon with a single sign-on and have access to the plurality of enterprise applications. The script uses the single sign-on security information, and perhaps other information, to authenticate the user and access the login information for each of the enterprise applications. The script is further operable to automatically interface with the enterprise applications through user input windows, such as by scripting login information automatically into the enterprise application login windows.

27 Claims, 13 Drawing Sheets

OTHER PUBLICATIONS

Boydstun, Kenneth C.., et al., *Business-To-Business Security Integration*, Filing Date—Jul. 31, 2003, U.S. Appl. No. 10/631,984, Specification (29 pgs.), Drawings (3 sheets).

Himawan, Rudi, et al., "Single Sign-On System and Method", filed Nov. 22, 2004, U.S. Appl. No. 10/994,997.

Allababidi, Mouaz, et al., "Integrated User Profile Administration Tool", filed Apr. 13, 2006, U.S. Appl. No. 11/403,619.

Office Action dated Mar. 17, 2008, U.S. Appl. No. 11/403,619, filed Apr. 13, 2006.

Office Action dated Apr. 14, 2008; U.S. Appl. No. 10/994,997, filed Nov. 22, 2004.

Notice of Allowance and Fee(s) Due dated Oct. 23, 2008, U.S. Appl. No. 10/994,997, filed Nov. 22, 2004.

Final Office Action dated Oct. 6, 2008, U.S. Appl. No. 11/403,619, filed Apr. 13, 2006.

\* cited by examiner

CALL CENTER DASHBOARD

CROSS-REFERENCE TO RELATED APPLICATIONS

This application includes subject matter related to U.S. patent application Ser. No. 10/284,680, filed Oct. 31, 2002, entitled "Security Framework Bridge", by Ken Boydstun, et al, and to U.S. patent application Ser. No. 10/631,984, filed Jul. 31, 2003, entitled "Business-to-business Security Integration", by Kenneth Boydstun, et al, both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software for controlling access to enterprise computer applications, and more particularly, but not by way of limitation, to a system and method for providing a single sign-on capability for users.

BACKGROUND OF THE INVENTION

Employees in businesses may use multiple computer programs or applications during the course of performing their tasks. Typically each application requires a user to login using a user identity and a password. The user identity and the password of an individual employee may not be the same from one application to another. Applications may require users to change their passwords periodically, every 60 days for example. Applications may require that passwords meet certain criteria such as containing a minimum number of characters, at least one upper case character, at least one numeral, and/or at least one special character. The password change period and the criteria for constructing passwords typically are different among the applications.

SUMMARY OF THE INVENTION

In one embodiment, a password management system is provided. The password management system includes a plurality of enterprise applications, an application security data store, an authentication component, a web server, an application server, and password management applications and clients. The plurality of enterprise applications are accessible by a desktop computer by providing user security information. The application security data store stores the user security information, and the web server communicates with the authentication component to authenticate a request for web services and to forward a request for the user security information. The application server receives the request for the user security information from the web server for user security information. The password management application is preferably executed by the application server. The password management application requests user security information related to one or more of the enterprise applications from the application security data store. The password management application also updates the user security information maintained by the application security data store. The password management client is preferably resident on the desktop computer in communication with the web server. The password management client is operable using single sign-on information to be authenticated by the authentication component and obtain user security information for one or more of the enterprise applications from the password management application. The password management client uses the user security information to access the one or more enterprise applications.

In another embodiment, a method for logging into enterprise applications from a computer is provided. The method includes logging into a password management system using a single sign-on login information, and authenticating the single sign-on login information to access a business enterprise. The method includes requesting login information for one of the enterprise applications, and retrieving the login information from a data store. The method also provides for using the login information to log into at least one of the enterprise applications.

In one embodiment, a method for logging into a enterprise application from a computer is provided that includes attempting to log into a password management system and receiving an out of service message. The method includes logging into a backup password management system, and retrieving a login information for a plurality of enterprise applications from the backup password management system. The method includes providing the login information for the enterprise applications in clear text, and using the login information to log into one or more of the enterprise applications.

In still another embodiment, a method for logging into enterprise applications from computers local and remote to an enterprise using a single sign-on is provided. The method includes using a single sign-on information from the remote computer to log into a server communicating with a web server of the enterprise. The method includes authenticating the single sign-on information received from the remote computer and security information to access the enterprise. The method includes requesting login information specific to at least one enterprise application, and retrieving enterprise application login information from a data store. The method includes using the enterprise application login information to log into one or more of the enterprise applications by the remote computer. The method provides for using the single sign-on information from the local computer to log into the web server, and authenticating the single sign-on information received from the local computer to access the enterprise. The method also provides for using the enterprise application login information to log into one or more of the enterprise applications by the local computer.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Employees working in call centers may employ many applications in the course of receiving and responding to customer calls. These applications may be referred to as customer care applications. Call center employees may be required to remember many different passwords to access the applications. With passwords being changed periodically and with application password criteria requiring mixed character strings, it will be readily appreciated that call center employees find it difficult to remember all of the passwords to the applications that they use. When a call center employee forgets a password to an application, the employee may call a help desk or administrator and request that the forgotten password be reset. Having to request that the password be reset delays providing service to the customer, decreasing customer satisfaction.

While call center employees are a signal case of individuals having difficulty coping with multiple passwords, employees in other positions may also experience similar difficulties coping with multiple passwords. What is needed is a single sign-on solution to access the applications of an enterprise that requires no changes to the applications and which hides the details of changing passwords periodically. The present disclosure provides a single sign-on solution, which may be referred to as a call center dashboard, for users both internal and external to the corporate firewall that may not require any changes to the applications. The call center dashboard single sign-on solution securely accesses a database to obtain the passwords to each of the applications utilized by an individual user and then interacts with the applications to log the user into the applications. The call center dashboard single sign-on solution changes passwords when prompted by the applications and securely stores the new passwords back on the database without user intervention. The call center dashboard single sign-on solution does not change how the individual user interacts with the applications but enhances the experience of the call center workers and the service provided to the enterprise customers.

Figure 1:
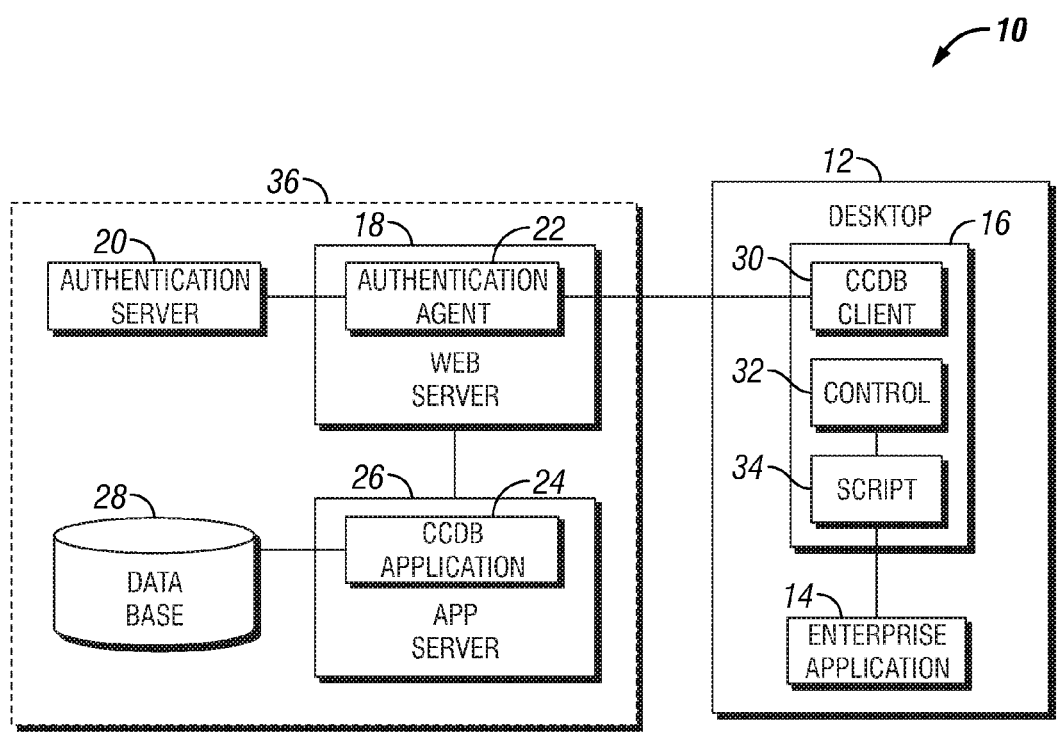
FIG. 1 is a block diagram of a password management system according to an embodiment of the disclosure.

Turning now to FIG. 1, a block diagram depicts a system 10 for implementing embodiments of the present disclosure. A desktop computer 12 provides access to a password protected computer program, such as an enterprise application 14, which may be referred to as a customer care application, through a call center dashboard desktop 16. The term enterprise application 14 is used herein to reference any computer program or application used by an enterprise, corporation, business, organization, or individual which is password protected or otherwise authenticates a user before providing functionality. Although FIG. 1 depicts only one enterprise application 14, several enterprise applications 14 may be supported by the system 10. A telecommunications provider or carrier may employ the enterprise applications 14 for provisioning a cell phone or for troubleshooting customer billing issues, for example. The call center dashboard desktop 16 logs the user into the enterprise application 14, including providing a user identity, a user password, and other secure user information as needed by the particular enterprise application 14. The user identity, user password, and other secure user information may be referred to collectively as login information. The call center dashboard desktop 16 requests the login information from a web server 18.

The web server 18 first authenticates the requester, in this case the call center dashboard desktop 16, with an authentication server 20. An authentication agent 22 at the web server 18 mediates between the web server 18 and the authentication server 20 to authenticate the requestor for the web server 18. Assuming the requestor is authenticated, the web server 18 forwards the request to a call center dashboard application 24 executing on an application server 26. In an embodiment, the interface between the web server 18 and the call center dashboard application 24 may be provided as a JAVA server page (JSP). The JAVA server page is logically a part of the call center dashboard application 24.

The call center dashboard application 24 communicates with an application security data store 28 which contains the login information. The call center dashboard application 24 obtains the login information from the application security data store 28 and returns the login information to the web server 18. The web server 18 returns the login information to the call center dashboard desktop 16. The call center dashboard desktop 16 logs the user in to the enterprise application 14. The web server 18, the authentication agent 22, the application server 26, the call center dashboard application 24, the authentication server 20, and the application security data store 28 may be referred to collectively as the back end 36 of the system 10.

The call center dashboard desktop 16 includes a call center dashboard client 30, a control 32, and a script 34. The call center dashboard desktop 16 provides an application icon (not shown) associated with the enterprise application 14. When the user clicks on the application icon, the control 32 associated with the application icon executes. The only action of the control 32 is to execute the script 34. The script 34 interacts with the enterprise application 14 and the web server 18 as described above to login to the enterprise application 14. In the preferred embodiment, the control 32 is a Microsoft ActiveX control, but alternate technologies may be employed to implement the control 32 to execute the script 34.

In the case that the user password for the enterprise application 14 has expired, the script 34 is operable to detect the expiration of the user password, to dialog with the enterprise application 14 to change the user password to a valid changed password generated by the script 34. The script 34 is further operable to communicate with the web server 18, via the call center dashboard client 30, to request that the changed user password be stored in the application security data store 28.

The script 34 is programmed to detect and respond appropriately to each of the windows which the enterprise application 14 may open. The script 34 may identify the appearance of windows, as for example using the identity of the window, the title of the window, and/or the text layout of the window all of which are stored in application security data store 28 or programmed in to the scripts 34. The identity of the window, the title of the window, and the text layout of the windows that the enterprise application 14 may open may be determined by researching and/or executing the enterprise application 14. The scripts 34 detect, for example, normal login windows, password change windows, invalid password windows, changed password malformed windows, and other password or authentication related windows. The script 34 automatically generates, without intervention of the user, an updated password which conforms to the specific password requirements of the enterprise application 14, all of which may be stored in application security data store 28, and sends 302 the password update to the enterprise application 14, as for example by interacting with the password change dialog box window of the application.

In an embodiment, the authentication server 20 and authentication agent 22 are provided by the Netegrity, Inc. Site-Minder authentication software package. In a typical sequence of events, a request associated with a user arrives at the web server 18. The authentication agent 22 sends the identity of the user and the identity of the requested resource to the authentication server 20. The authentication server 20 compares the identity of the user with the authorization policy for the requested resource, in this case the call center dashboard services. If the comparison is successful, the authentication server 20 authorizes the access, and the web server 18 forwards the request to the application server 26 for action. For further details related to the use of the Netegrity, Inc. SiteMinder authentication software package, see the related U.S. patent application Ser. No. 10/284,680, filed Oct. 31, 2002, entitled "Security Framework Bridge", by Ken Boydstun, et al, and U.S. patent application Ser. No. 10/631,984, filed Jul. 31, 2003, entitled "Business-to-business Security Integration", by Kenneth Boydstun, et al, both of which are incorporated herein by reference for all purposes.

The operations described briefly above as well as others yet to be disclosed are described more fully hereinafter with reference to a plurality of message sequence diagrams. The components described above are all computer programs or applications that may be executed on a general purpose computer system. General purpose computer systems are described in greater detail hereinafter.

Figure 2:
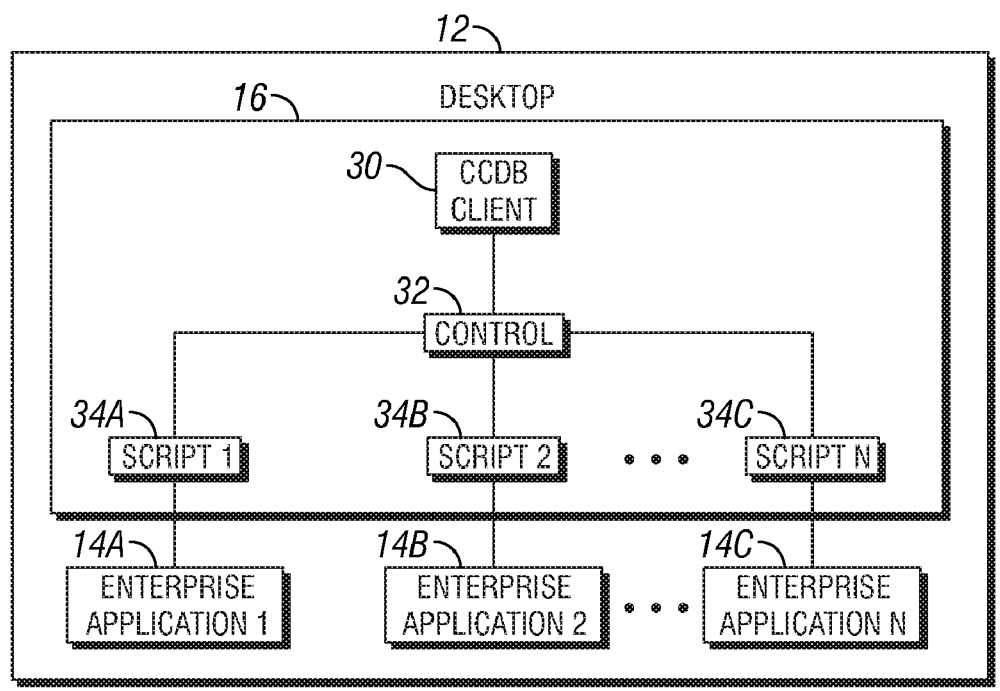
FIG. 2 is a block diagram of a computer environment according to an embodiment.

Turning now to FIG. 2, a detailed block diagram of the desktop computer 12 is provided. The call center dashboard client 30 is in communication with a control 32. As stated above, in the preferred embodiment, the control 32 is a Microsoft ActiveX control, but alternate technologies may be employed to implement the control 32. An ActiveX control is a program able to execute with powerful privileges on the desktop computer 12 that can be distributed from a web page, in this case from the web server 18 to the desktop computer 12. The ActiveX control employed in the system 10 is signed using an enterprise certificate for authentication purposes.

The control 32 is in communication with a plurality of scripts 34—a first script 34a, a second script 34b, and a third script 34c. The scripts 34 login to a plurality of enterprise applications 14—the first script 34a logs in to a first enterprise application 14a, the second script 34b logs in to a second enterprise application 14b, and the third script 34c logs in to a third enterprise application 14c. While three enterprise applications 14 are depicted, the number of enterprise applications 14 may be either greater or fewer than three. The number of enterprise applications 14 agrees with and determines the number of the scripts 34.

The system 10 described with reference to FIG. 1 and FIG. 2 provides a single sign-on solution to a user logging in to the enterprise applications 14. When logging in to the call center dashboard desktop 16, the user is challenged for a user identity and user password, which may be a corporate identity and corporate password for example. Once logged in to the call center dashboard desktop 16, the user need only click on the icons associated with the enterprise applications 14, and the call center dashboard desktop 16 then dialogs with the enterprise applications 14 to supply passwords and update passwords if need be. While the exemplary system 10 depicted in FIG. 1 and FIG. 2 is directed to a call center and the customer care applications that operators in a call center may employ to serve their customers, one skilled in the art will readily appreciate that the exemplary system 10 may be applied to other environments using other kinds of applications.

Figure 3:
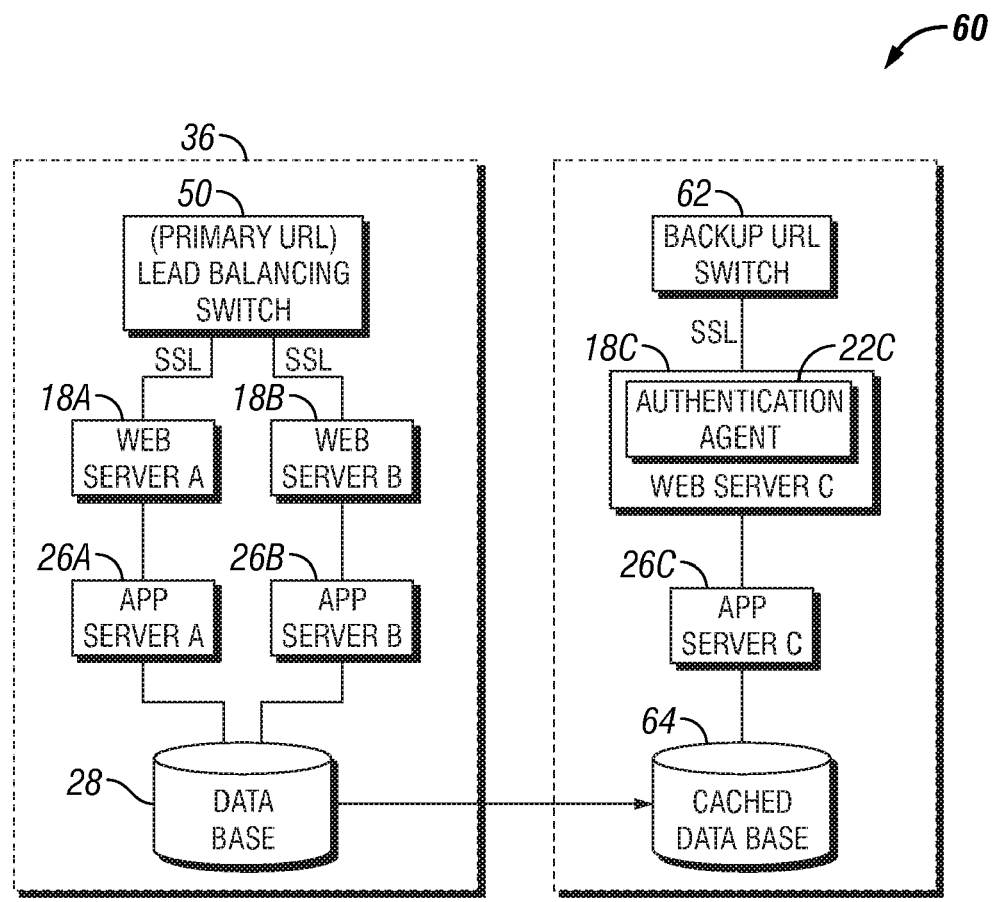
FIG. 3 is a block diagram of a password management system including a load balancing switch and a backup password access mechanism according to an embodiment.

Turning now to FIG. 3, a block diagram of an embodiment of the back-end 36 of the system 10 is depicted. The call center dashboard client 30 may send a request to the web server 18 via a load balancing switch 50 accessed by sending the request to a primary or a first universal resource locator (URL). The load balancing switch 50 distributes the request to a first web server 18a or a second web server 18b based on the current processing load of the web servers 18 and/or the application servers 26. The application servers 26 include a first application server 26a in communication with the first web server 18a and a second application server 26b in communication with the second web server 18b. The load balancing switch 50 communicates with the web servers 18 over a secure socket layer (SSL). The processing of the request from the call center dashboard client 30 after it is routed to the selected web server 18 is as described above. In other embodiments, more than two web servers 18 and more than two application servers 26 may be employed.

If either the application security data store 28 or the authentication server 20 become inoperable, the login information stored in the application security data store 28 may become unavailable, and hence users may not be able to log into the enterprise applications 14 without having their passwords reset, such as by help desk personnel or application administrators. In the event the application security data store 28 or the authentication server 20 become inoperable, a backup system 60 may be automatically enabled by a software component, for example the call center dashboard application 24, or manually enabled by administrators, and provides a component which users may use to access login information. The software component may provide, for example, the user his or her password in clear text, and the user may then use the password to manually login to the enterprise applications 14.

The backup system 60 includes a backup switch 62 which is accessed using an alternate universal resource locator. The desktop computer 12 may provide an icon linked to the backup system 60 in addition to providing an icon linked to the call center dashboard desktop 16. The backup switch 62 routes user requests to a third web server 18c over a secure socket layer interface. The third web server 18c may listen for requests on a protocol port number which is different from the protocol port number on which the first web server 18a and the second web server 18b, part of system 10, listen for requests. The third web server 18c authenticates the requestor, in this case the user, with an alternate authentication server (not shown). An authentication agent 22c within the web server 18c mediates between the web server 18c and the alternate authentication server (not shown). The third web server 18c passes requests for login information to a third application server 26c. Note that the third application server 26c may be a separate back-up application server or may be the first application server 26a responding to requests for back-up services or the second application server 26b responding to requests for back-up services. The third application server 26c requests the login information from a cached application security data store 64. The login information is retrieved from the cached application security data store 64 and forwarded back to the web server 18c for display to the user's browser in clear text. The user may then use the clear text login information to log into the desired enterprise applications 14 manually. This is one method of providing users access when the application security data store 28 or the authentication server 20 are inoperable.

During normal operations of the system 10, the cached application security data store 64 is periodically updated with login information from the application security data store 28. In an embodiment, the update may occur every five minutes or every twenty minutes. In other embodiments, other update periods may be employed.

Figure 4:
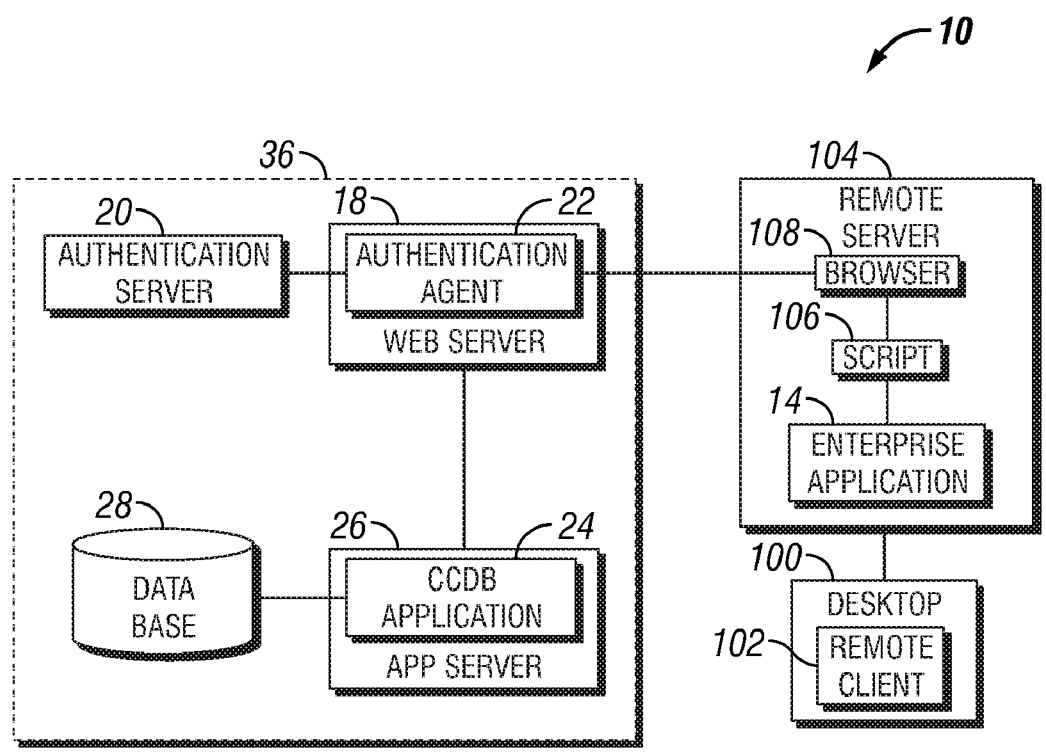
FIG. 4 is a block diagram of a password management system supporting remote users according to an embodiment.

Turning now to FIG. 4, another embodiment of the system 10 for supporting users outside of the enterprise is depicted. A remote desktop computer 100 includes a remote client 102. The remote desktop computer 100, using the remote client 102, may log into a remote server 104 located within the enterprise. The remote server 104 provides the password protected enterprise application 14, a remote script 106, and a web browser 108. In the preferred embodiment, the remote client 102 is a CITRIX client and the remote server 104 is a CITRIX server. In another embodiment, the remote client and remote server may be provided by a different remote access software tool. The back end 36 is the same as that used by the non-CITRIX access using the desktop computer 12 as previously described.

When the remote user logs into the remote server 104 from the remote desktop computer 100, an icon associated with the password protected enterprise application 14 is displayed to the remote user on the remote desktop computer 100. When the remote user clicks on the icon associated with the password protected enterprise application 14, the remote script 106 executes and causes the web browser 108 to send a request for login information to the web server 18. With the request for login information, the web browser 108 may include, for example, the identity of the remote user, the identity of the application that the remote user is requesting to access, and other authentication, such as a hash value, which may be referred to as a digest, formed by hashing the remote script 106 using the MD5 secure hashing algorithm. MD5 may stand for "message digest 5." Other security means and/or information may be used for authenticating the request and readily suggest themselves to one skilled in the art. The identity of the remote user, the identity of the application, and the hash value or digest may be referred to as secure tokens or tokens. Also, the internet protocol address of the remote server 104 may be included with the secure tokens.

The web server 18 authenticates the request from the remote server 104 differently than the request from the desktop computer 12. If the remote script 106 has been tampered with, the hash value or digest provided by the web browser 108 with the secure tokens will not agree with the hash value or digest that the application server 26 may calculate on the application server 26. In this case access will be denied by the web browser 108. The remote script 106 may be tampered with, for example, in an attempt to defeat the security provisions of the system 10. In an embodiment, the application server 26 may precalculate and store the hash value rather than calculating the hash value on the fly. If the secure tokens meet the expectations of the application server 26 for the internet protocol address of the remote server 104, user identity, digest, domain, the application server 26 associates an administrator identity, which may be termed a proxy identity, with the request, conducts authentication through the authentication server 20 based on this proxy identity, and forwards the request for service to the application server 26.

To confirm or authenticate the provided internet protocol address of the remote server 104, the call center dashboard application 24 looks up the needed login information, and the login information is forwarded back to the requesting remote script 106. The call center dashboard application 24 may store instructions referencing specific internet protocol addresses of the remote servers 104 or a covering range of internet protocol addresses of the remote servers 104. Alternatively, the call center dashboard application 24 may read specific internet protocol addresses of the remote servers 104 or a covering range of internet protocol addresses of the remote servers 104 from a stored file, for example stored in the application security data store 28. The remote script 106 then logs into the password protected enterprise application 14 on behalf of the remote user as previously discussed. From this point on, the remote user interacts with the password protected enterprise application 14 via the mediation of the remote client 102.

Figure 5:
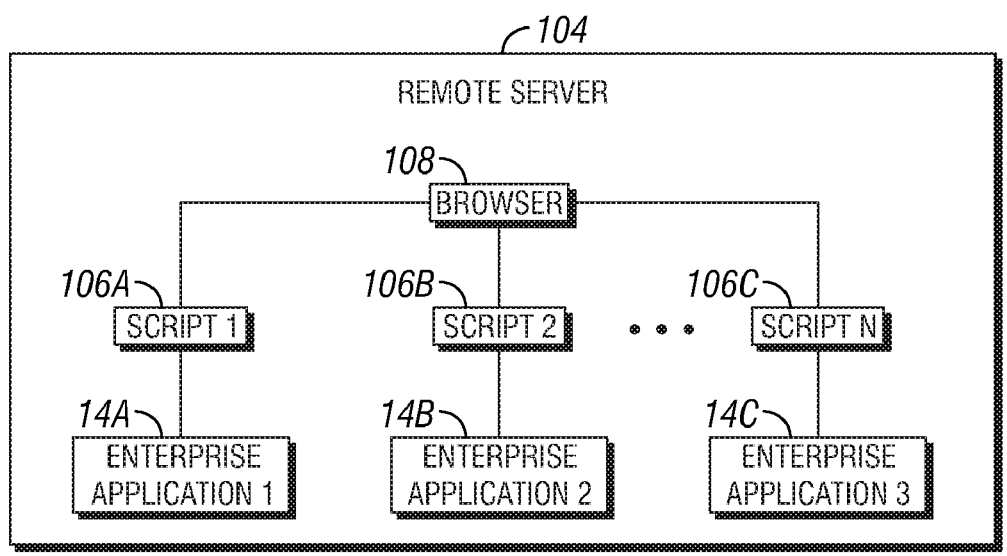
FIG. 5 is a block diagram of a computer environment for a remote server according to an embodiment.

Turning to FIG. 5, a detailed block diagram of the remote desktop computer 100 is depicted. When the remote user logs into the remote client 102, icons for each of the plurality of password protected enterprise applications 14—the first enterprise application 14a, the second enterprise application 14b, and the third enterprise application 14c will display on the remote desktop computer 100. Each enterprise application 14 is associated with a remote script 106—the first enterprise application 14a associated with a first remote script 106a, the second enterprise application 14b associated with a second remote script 106b, and the third enterprise application 14c associated with a third remote script 106c. The number of remote scripts 106 agrees with and determines the number of enterprise applications 14. In some embodiments more or fewer applications and call center dashboard scripts may be provided.

To provide the computing power needed to execute the enterprise applications 14 on the remote server 104, a plurality of remote servers 104 are provided by the system 10, and the remote users are connected to one of the remote servers 104 by a switch (not shown).

Figure 6:
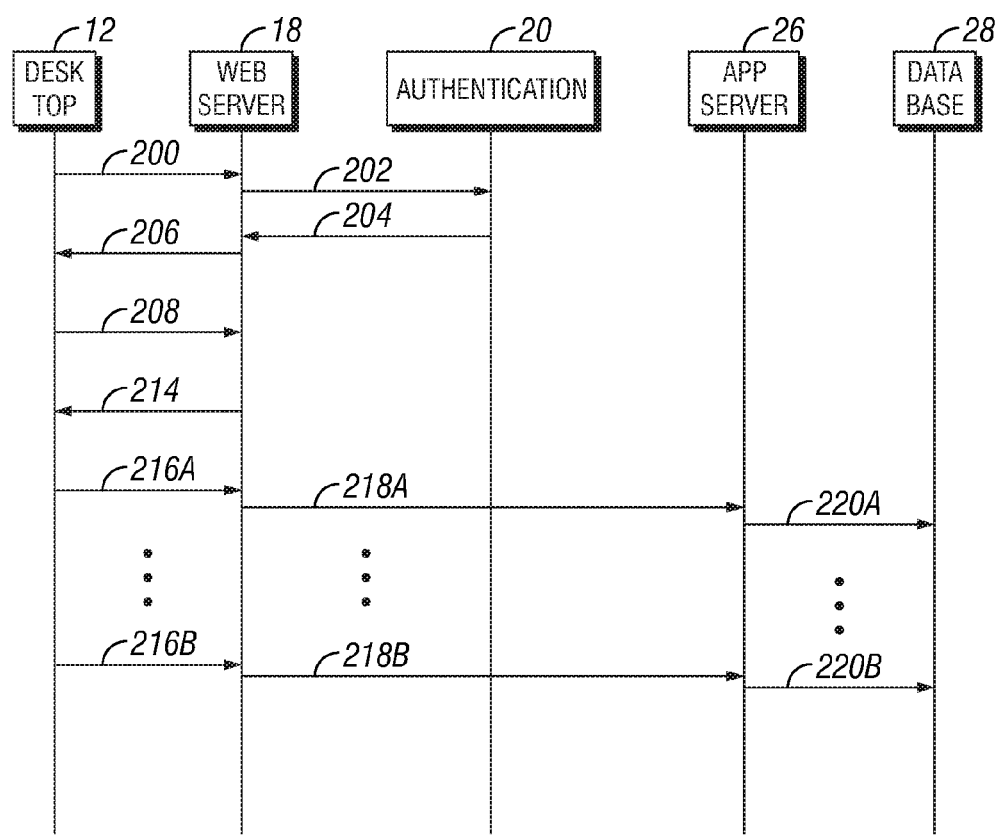
FIG. 6 is a message sequence diagram depicting an initialization sequence of the password management system according to an embodiment.

Turning now to FIG. 6, a message sequence diagram depicts an exemplary initialization of the desktop computer 12. In message sequence diagrams vertical lines are associated with communicating entities. The specific communicating entities are identified at the top of the vertical lines.

Horizontal lines terminated with an arrowhead indicating direction represent messages or events which flow between the communicating entities. Messages and events occurring earlier in time are located higher up on the message sequence diagram than messages and events occurring later in time. Sometimes an event is depicted as originating and terminating on the same entity to capture an action confined to the entity itself or to capture a user action, as for example the clicking of an icon displayed in a graphical user interface.

Initially the call center dashboard client 30 and the enterprise applications 14 are installed on the desktop computer 12. The user selects the call center dashboard icon, and the desktop computer 12, via the call center dashboard client 30, sends 200 a call center dashboard login request to the web server 18. The web server 18 sends 202 an authenticate user request to the authentication server 20. The authentication server 20 validates the user and returns 204 an authentication response to the web server 18. Assuming the authentication response is positive and the user is authenticated successfully, the web server 18 sends 206 a call center dashboard login response to the desktop computer 12.

The call center dashboard client 30 recognizes that the desktop computer 12 has not been configured with the control 32 and the scripts 34. Accordingly, the desktop computer 12 sends 208 a request for the control 32 and scripts 34 to the web server 18. The web server 18 returns 214 a response containing the control 32 and the scripts 34 to the desktop computer 12. The call center dashboard client 30 installs the control 32 and the scripts 34 on the desktop computer 12 in the appropriate places and creates icons associated with each of the enterprise applications 14 linked to the control 32. In the case that the control 32 is Microsoft ActiveX control, the desktop computer 12 asks the user to accept or reject installation of each of the Microsoft ActiveX controls and also provides notification of the presence of the enterprise signature with the Microsoft ActiveX controls. In the preferred embodiment, the control 32 and the scripts 34 are compressed and packaged in a file for sending to the desktop computer 12. The file format used may be the Microsoft cabinet file format, the JAVA archive (JAR) file format, or some other file format as known to one skilled in the art.

To initially set-up the system 10, the user names and user passwords for each of the enterprise applications 14 must be taught to the system 10. In one embodiment, the call center dashboard client 30 prompts the user for login information for each of the enterprise applications 14. The desktop computer 12 sends 216a the login information for the first enterprise application 14a to the web server 18. The web server 18 forwards 218a the login information to the application server 26. The application server 26 sends 220a the login information to the application security data store 28. The desktop computer 12 repeats this message sequence 216, 218, and 220 for each of the enterprise applications 14. The diagram depicts the message sequence for storing login information for the second enterprise application 14b, comprising messages 216b, 218b, and 220b, but one skilled in the art will readily appreciate that this message sequence may be altered or repeated the appropriate number of times to store all the needed login information in the application security data store 28.

At the completion of the message sequence depicted in FIG. 6 the system 10 may be said to be initialized. The process of prompting for and storing login information may be referred to as a learning mode of the system 10. When the control 32 or the scripts 34 are updated in the back end 36, the call center dashboard client 30 detects the change. In this case, the call center dashboard client 30 will request the current control 32 and/or scripts 34 from the back end 36 using messages 208 and 214 as described above.

The call center dashboard remote scripts 106 may be updated on the remote servers 104 by any method for updating a plurality of servers with common software such as would be known to one skilled in the art, for example a network push utility which installs software overnight. The remote desktop computer 100 and remote server 104 also support a learning mode very similar to that supported by the non-remote portion of the system 10.

Figure 7:
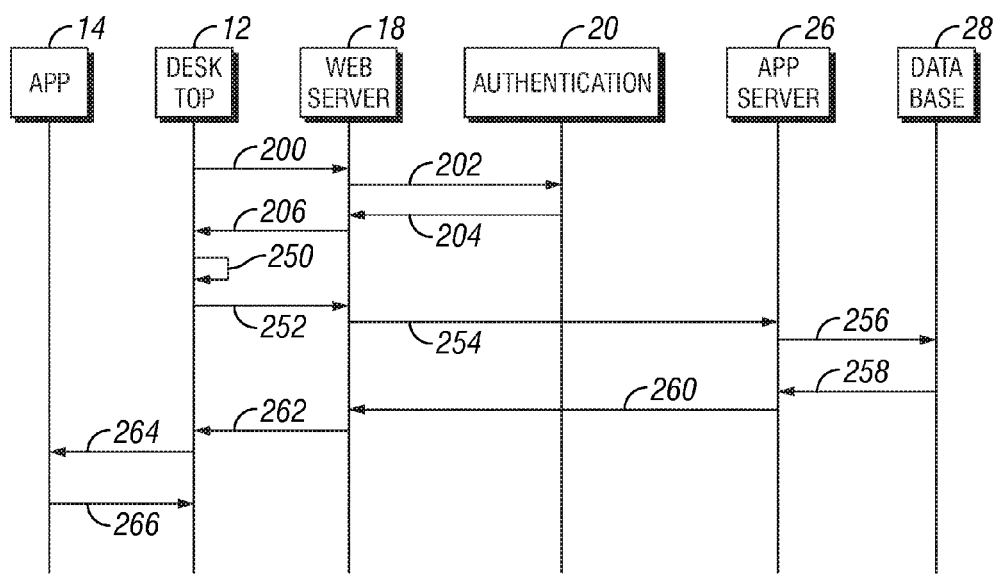
FIG. 7 is a message sequence diagram depicting a first login sequence of the password management system according to an embodiment.

Turning now to FIG. 7, a message sequence diagram depicts an exemplary method of the desktop computer 12 for logging into the enterprise application 14 using the system 10. The user logs into the call center dashboard client 30 with messages 200, 202, 204, and 206 as described above with reference to FIG. 6. At label 250 the user clicks the icon associated with the enterprise application 14, for example. The control 32 executes and causes the script 34 associated with the enterprise application 14 to execute. The desktop computer 12, on behalf of the script 34, sends 252 a request for login information to the web server 18. The web server 18 forwards 254 the request to the application server 26, and the application server 26 requests 256 the login information associated with the enterprise application 14 from the application security data store 28. The application security data store 28 returns 258 the login information to the application server 26. The application server 26 returns 260 the login information to the web server 18. The web server 18 returns 262 the login information to the desktop computer 12. The script 34 associated with the enterprise application 14 invokes 264 the enterprise application 14 using the login information, and the enterprise application 14 opens 266 for the user, for example displaying a graphical user interface allowing the user to operate the enterprise application 14.

Figure 8:
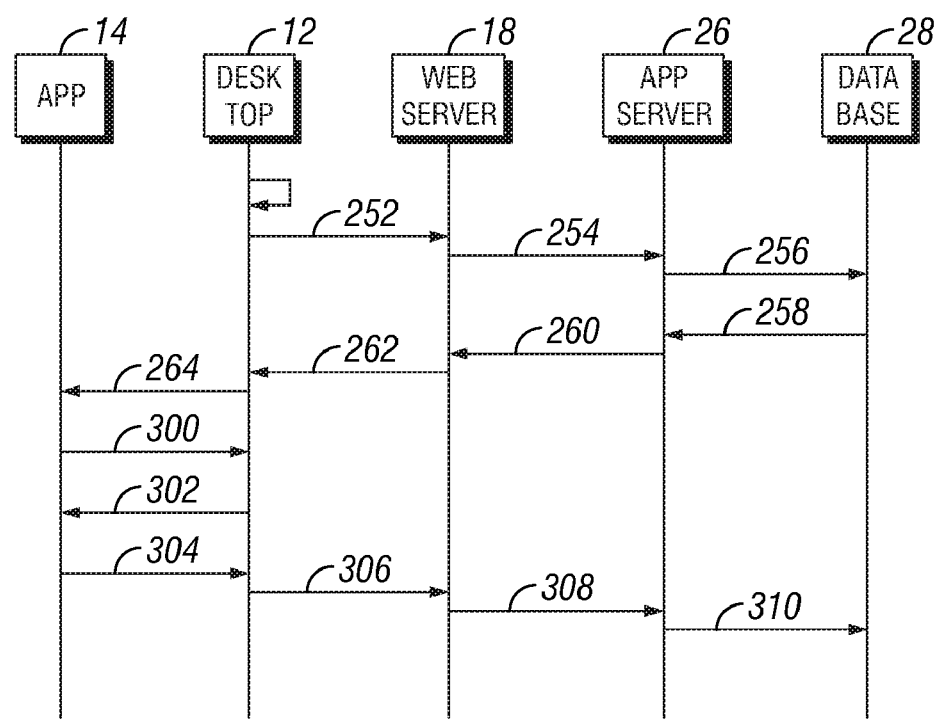
FIG. 8 is a message sequence diagram depicting a second login sequence of the password management system according to an embodiment.

Turning to FIG. 8, a message sequence diagram depicts an alternate exemplary method of the desktop computer 12 for logging into the enterprise application 14 using the system 10 wherein the enterprise application 14 requires that the user password be updated. As in FIG. 7 above, at label 250 the user clicks the icon associated with the enterprise application 14, for example. As in FIG. 7 above, the login information is obtained and provided to the enterprise application 14 at labels 252, 254, 256, 258, 260, 262, and 264. In the case of FIG. 8, however, the enterprise application 14 decides that the user password is due to be changed, for example at the end of a 45 day password update period.

The enterprise application 14 sends 300 a request to change the password to script 34 on the desktop computer 12. In the preferred embodiment, the enterprise application 14 opens a password change dialog box window for a user to change the password, and the script 34 detects and identifies the appearance of this window, as for example using the identity of the window, the title of the window, and/or the text layout of the window all of which are stored in data store 28 or programmed in to the scripts 34. The identity of the window, the title of the window, and the text layout of the window may be determined by researching the enterprise application 14. The script 34 automatically generates, without intervention of the user, an updated password which conforms to the specific password requirements of the enterprise application 14, all of which may be stored in data store 28, and sends 302 the password update to the enterprise application 14, as for example by interacting with the password change dialog box window of the application.

The enterprise application 14 opens 304 for the user, for example displaying a graphical user interface allowing the user to operate the enterprise application 14. The desktop computer 12 sends 306 a password update message to the web server 18. The web server 18 sends 308 the password update message to the application server 26. The application server 26 sends 310 the password update message to the application security data store 28. While not depicted here, in another embodiment confirmation of the storage of the password update in the application security data store 28 may be sent back to the desktop computer 12. Note that the desktop computer 12, specifically the script 34, does not return the password update message until after the enterprise application 14 has accepted the password update.

The script 34 may also store the password update in a recovery file prior to the action at label 302. In the event that the desktop computer 12 crashes after the enterprise application 14 updates the password but before the password is stored to the application security data store 28, the script 34 may use the recovery file to complete the storing of the updated password to the application security data store 28. After the script 34 has stored the updated password to the application security data store 28, either in a normal password update scenario or in a recovery scenario, the recovery file may be deleted. As will be readily apparent to one skilled in the art, there are many error scenarios which may be identified for the uses of the system 10. Similarly, there are many error handling scenarios which readily suggest themselves to one skilled in the art, which for the sake of brevity are not discussed herein.

Figure 9:
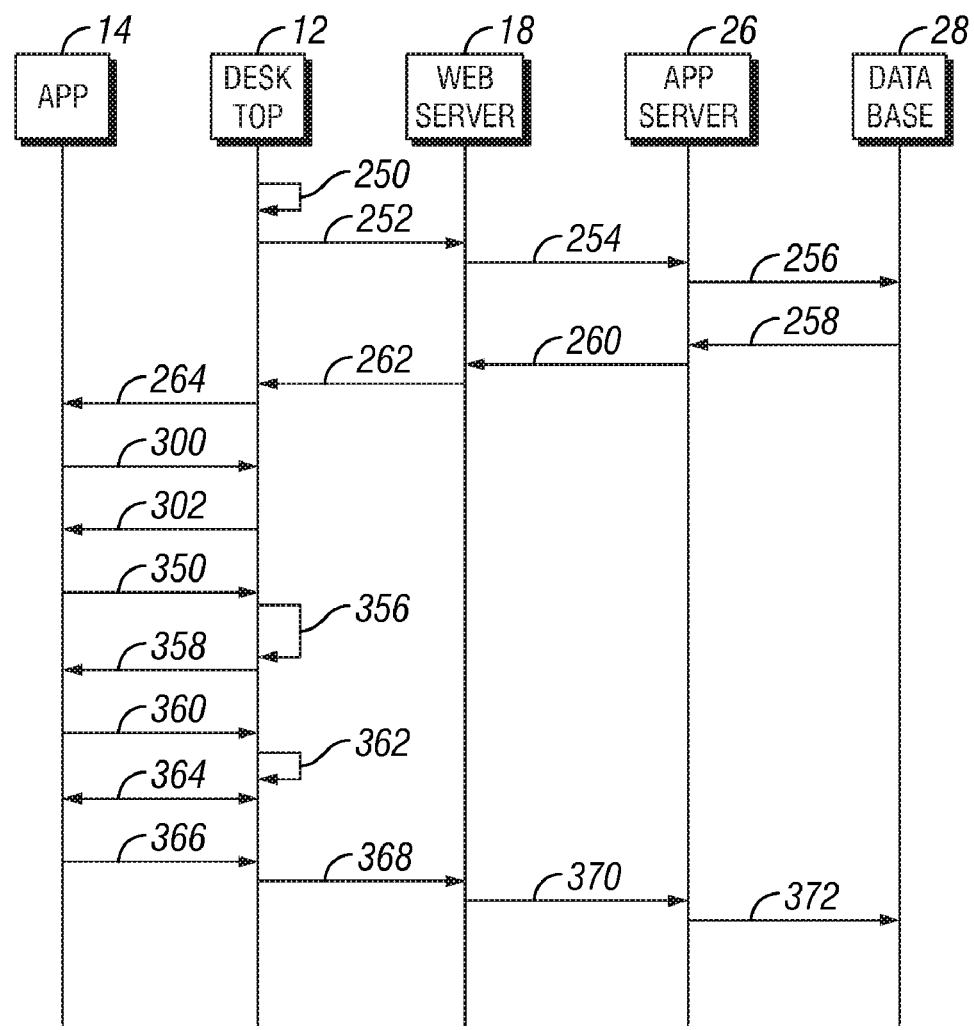
FIG. 9 is a message sequence diagram depicting a third login sequence of the password management system according to an embodiment.

Turning to FIG. 9, a message sequence diagram depicts an alternate exemplary method of the desktop computer 12 for logging into an enterprise application 14 using the system 10 wherein the application requires a new password to be provided and wherein the script 34 provides a malformed password. As in FIG. 7 above, at label 250 the user clicks the icon associated with the enterprise application 14, for example. As in FIG. 7 above, the login information is obtained and provided to the enterprise application 14 at labels 252, 254, 256, 258, 260, 262, and 264. In the case of FIG. 9 and of FIG. 8, however, the enterprise application 14 decides that the user password is due to be changed, for example at the end of a 45 day password update period. The enterprise application 14 sends 300 a request to change the password to script 34 on the desktop computer 12. The script 34 automatically generates, without intervention of the user, an updated password which is expected to conform to the specific password requirements of the enterprise application 14 and sends 302 the password update to the enterprise application 14.

The enterprise application 14 sends 350 a message rejecting the automatically generated updated password as not in conformance with the specific password requirements of the enterprise application 14 back to the desktop computer 12. In the preferred embodiment, the enterprise application 14 opens an invalid password change dialog box window for a user to change the password. The script 34 detects and identifies 356 the appearance of this window, as for example using the window identity, the window title, and/or the text layout of the window. In this case, the script 34 allows the user to manually enter a password update.

The user directly enters 358 a first manual password update for the enterprise application 14. The first manual password update, however, does not conform to the specific password requirements of the enterprise application 14, and the enterprise application 14 sends 360 a message rejecting the first manual password update. In the preferred embodiment, the enterprise application 14 opens an invalid password change dialog box window for a user to change the password. The script 34 detects and identifies 362 the appearance of this window and allows the user to manually enter a password update. The user directly enters 364 a second manual password update.

The application opens 366 for the user, for example displaying a graphical user interface allowing the user to operate the enterprise application 14. The desktop computer 12 sends 368 a password update message to the web server 18. The web server 18 sends 370 the password update message to the application server 26. The application server 26 sends 372 the password update message to the application security data store 28. While not depicted here, in another embodiment confirmation of the storage of the password update in the application security data store 28 may be sent back to the desktop computer 12. Note that the password update is not sent back to the application security data store 28 until the password update is accepted by the enterprise application 14.

Figure 10:
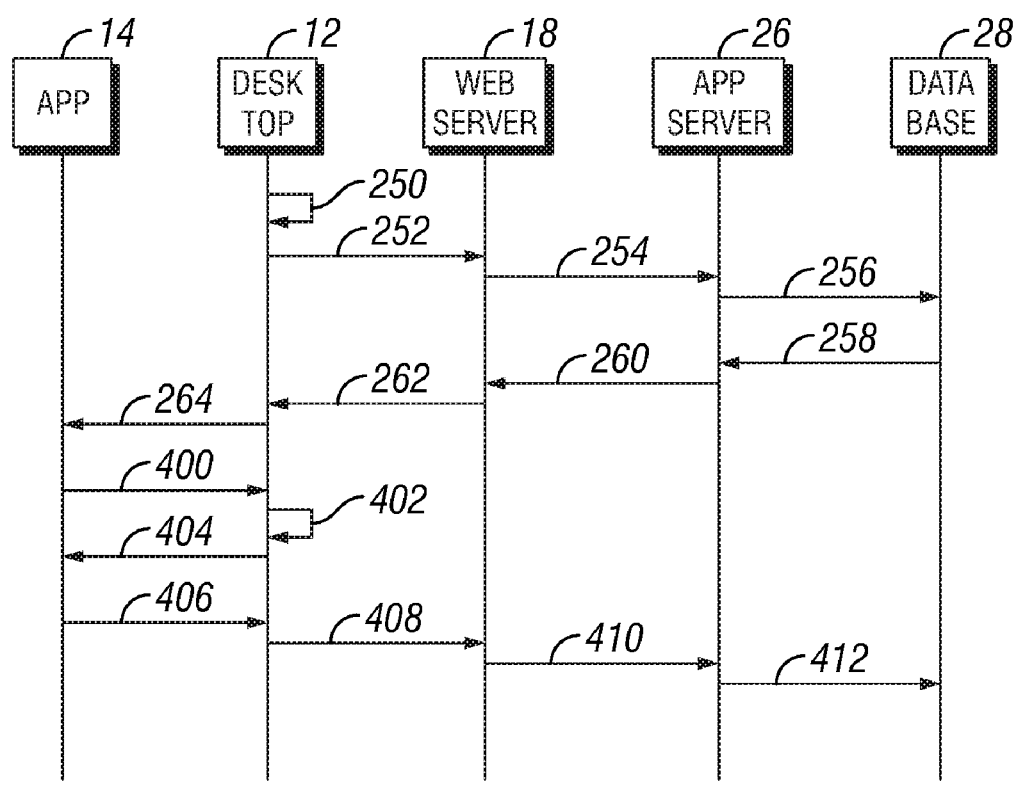
FIG. 10 is a message sequence diagram depicting a fourth login sequence of the password management system according to an embodiment.

Turning to FIG. 10, a message sequence diagram depicts an alternate exemplary method of the desktop computer 12 for logging into an enterprise application 14 using the system 10 wherein the password provided by the system 10 does not agree with the password stored by the enterprise application 14, as for example after a user has manually updated his or her password outside of the system 10. As in FIG. 7 above, at label 250 the user clicks the icon associated with the enterprise application 14, for example. As in FIG. 7 above, the login information is obtained and provided to the enterprise application 14 at labels 252, 254, 256, 258, 260, 262, and 264. In FIG. 10, however, the user has manually updated his or her application password, and this manually updated password was not stored in the application security data store 28.

The enterprise application 14 sends 400 a password failure message to the desktop computer 12. In the preferred embodiment, the enterprise application 14 opens an invalid password dialog box window for a user to change the password. The script 34 detects and identifies 402 the appearance of this window and allows the user to manually enter a password. The user manually enters 404 the appropriate password, for example the password which the user had manually updated.

The application opens 406 for the user, for example displaying a graphical user interface allowing the user to operate the enterprise application 14. The desktop computer 12 sends 408 a password update message to the web server 18. The web server 18 sends 410 the password update message to the application server 26. The application server 26 sends 412 the password update message to the application security data store 28. While not depicted here, in another embodiment confirmation of the storage of the password update in the application security data store 28 may be sent back to the desktop computer 12.

Figure 11:
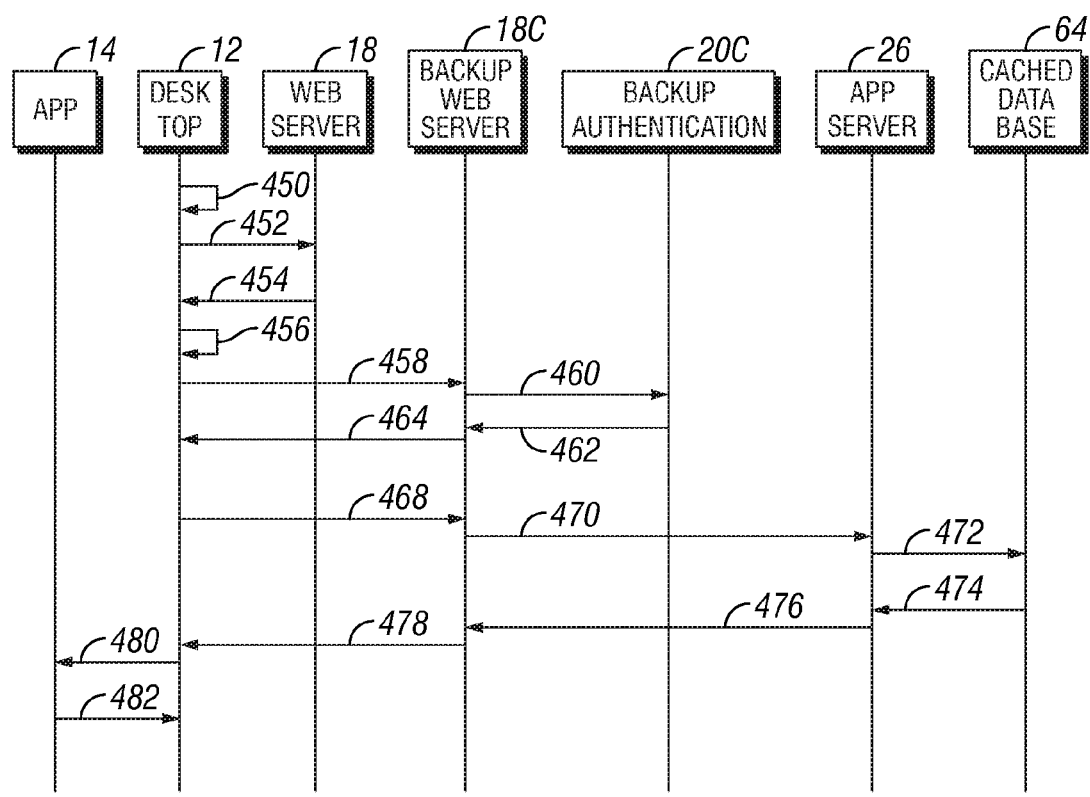
FIG. 11 is a message sequence diagram depicting a login sequence employing a backup of the password management system according to an embodiment.

Turning now to FIG. 11, a message sequence diagram depicts a method for logging into an enterprise application 14 using the backup system 60 depicted in FIG. 3. At label 450 the user selects the call center dashboard icon, and the desktop computer 12, via the call center dashboard client 30, sends 452 a call center dashboard login message to the web server 18. The web server 18 returns 454 an out of service message to the desktop computer 12, indicating that the authentication server 20 and/or the application security data store 28 are out of service.

At label 456 the user selects the alternate call center dashboard icon, and the desktop computer 12, via the call center dashboard client 30, sends 458 a call center dashboard login message to the backup web server 18c. Alternately, in an embodiment, when the back end system 36 is out of service, the call center dashboard client 30 may automatically remap the selection of the call center dashboard icon to send 458 the call center dashboard login message to the backup web server

18*c*. The backup web server 18*c* sends 460 an authentication request to the backup authentication server 20*c*. The backup authentication server 20*c* sends 462 an authentication response to the backup web server 18*c*. Assuming the authentication response is positive, the backup web server 18*c* sends 464 a call center dashboard login complete message to the desktop computer 12.

The call center dashboard client 30 sends 468 a request for alternate login information to the backup web server 18*c*. The backup web server 18*c* forwards 470 the request to the application server 26. The application server requests 472 the alternate login information from the cached application security data store 64. The cached application security data store 64 returns 474 the alternate login information to the application server 26. The application server 26 returns 476 the alternate login information to the backup web server 18*c*. The backup web server 18*c* returns 478 the alternate login information to the desktop computer 12.

The call center dashboard client 30 displays the alternate login information, comprising the passwords and other secure information as required, in clear text in a window to the user. At label 480 the user may then manually log into the enterprise application 14 using the alternate login information. The application opens 482 for the user, for example displaying a graphical user interface allowing the user to operate the enterprise application 14.

Figure 12:
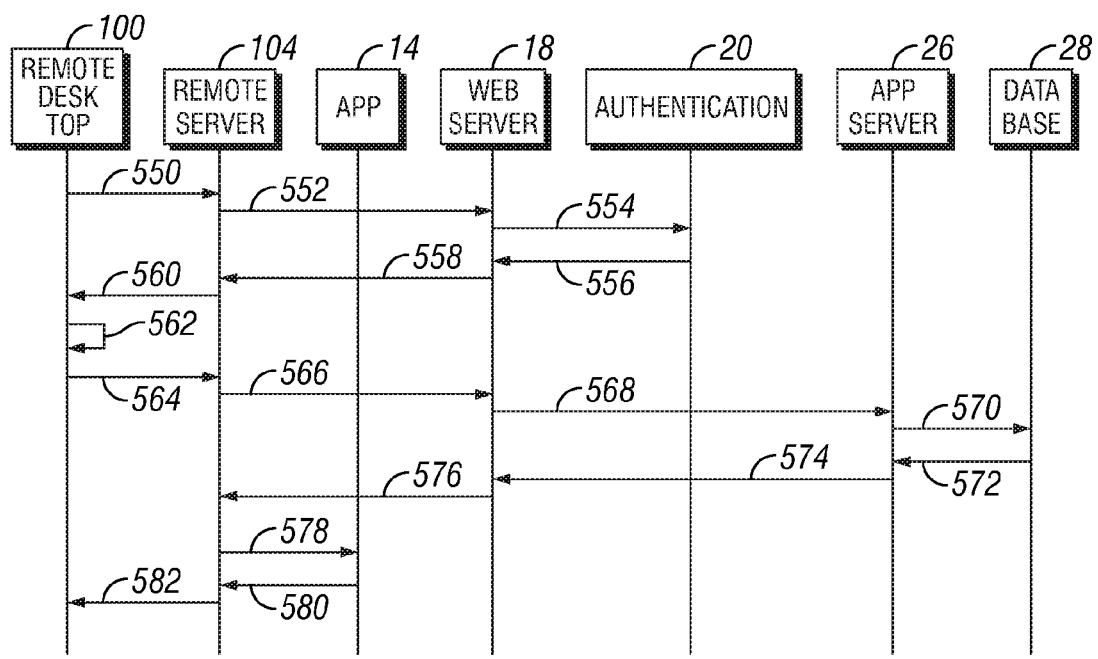
FIG. 12 is a message sequence diagram depicting a login sequence for a remote user of the password management system according to an embodiment.

Turning to FIG. 12, a message sequence diagram depicts an exemplary method of the remote desktop computer 100 logging into an enterprise application 14 using system 10. When the user logs into the remote client 102, the remote desktop computer 100 sends 550 a login message to the remote server 104. The remote server 104 sends 552 a request to authenticate the user to the web server 18. The web server 18 sends 554 the request to authenticate the user to the authentication server 20. The authentication server 20 sends 556 a response back to the web server 18. The web server 18 sends 558 the response back to the remote server 104. The remote server 104 sends 560 the response back to the remote desktop computer 100. Assuming the authentication succeeded, the user is presented with icons associated with each of the accessible enterprise applications 14.

At label 562 the user clicks on an application associated with the enterprise application 14. The remote desktop computer 100 sends 564 a request to log into the enterprise application 14 to the remote server 104. The remote server 104 invokes the remote script 106 associated with the application and sends 566 a request to the web server 18 for login information. The web server 18 sends 568 the request to the application server 26. The application server 26 sends 570 the request for login information to the application security data store 28. The application security data store 28 returns 572 the login information to the application server 26. The application server returns 574 the login information to the web server 18. The web server 18 returns 576 the login information to the remote server 104. At label 578 the call center dashboard remote script employs the login information to log the user into the enterprise application 14. The enterprise application 14 opens 580. The remote server 104 returns 582 an interface to the application to the remote desktop computer 100, for example displaying a graphical user interface allowing the user to operate the enterprise application 14.

One skilled in the art will readily understand how to extrapolate the password update message sequences of the desktop computer 12, FIGS. 8, 9, and 10, to the similar password update messages sequences for the remote desktop computer 100.

In another embodiment, some integrated applications may be integrated with the authentication software, for example with either the authentication server 20 and/or the authentication agent 22, and/or with the call center dashboard application 24. The integrated applications run on the web server 18 and provide a presentation view only to the desktop computer 12. The integrated applications may be referred to as thin clients because only a presentation portion of the integrated applications appear on the desktop computer 12. The authentication server 20, the authentication agent 22, and/or the call center dashboard application 24 may communicate with the integrated applications using an application programming interface (API) provided by the integrated applications.

The integrated applications provide an application programming interface to the authentication software and the web server 18 through which the authentication software and web server 18 may interact with the integrated applications. When the desktop computer 12 attempts to log into one of the integrated applications and the integrated application is due for the user password to be updated, the authentication software generates a valid password update to log into the integrated application and sends the new password to the call center dashboard application 24 for storing in the application security data store 28.

When the user logs into the call center dashboard desktop 16, only icons for the integrated applications which the user is authorized to access will appear on the desktop computer interface. The call center dashboard application 24 determines what integrated applications a user is authorized to access by retrieving access information for the user from the application security data store 28.

Figure 13:
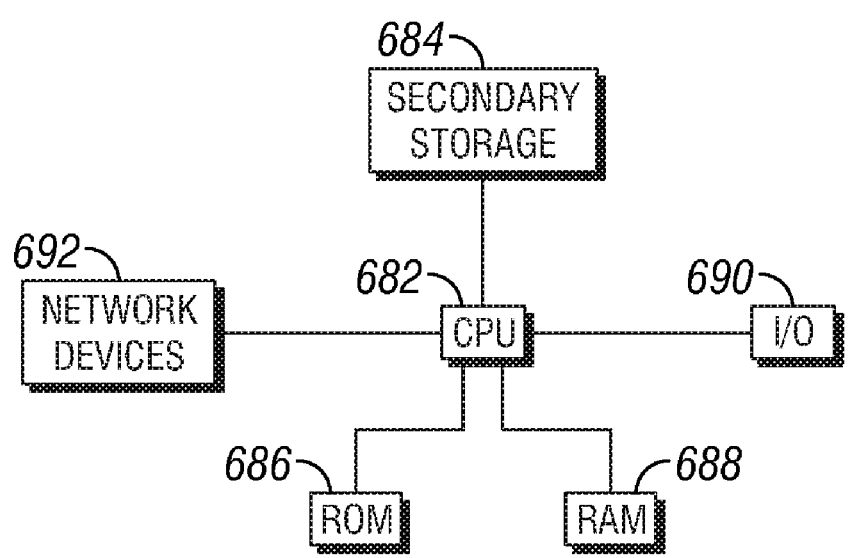
FIG. 13 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 13 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A password management system, comprising:
    a plurality of enterprise applications accessible by a desktop computer by providing user authentication information, wherein the user authentication information for a user is unique with respect to the user for at least two of the plurality of enterprise applications such that the user authentication information for the user for a first one of the at least two of the plurality of enterprise applications is different from the authentication information for the user for a second one of the at least two of the plurality of enterprise applications;
    an application security data store that stores the user authentication information;
    an authentication component;
    a web server that communicates with the authentication component to authenticate a request for web services and forwards a request for the user authentication information;
    an application server that receives the request for the user authentication from the web server for user authentication information;
    a password management application executed by the application server, the password management application that requests the user authentication information related to one or more of the enterprise applications from the application security data store, the password management application further updates the unique user authentication information maintained by the application security data store; and
    a password management client resident on the desktop computer in communication with the web server, the password management client uses single sign-on information to be authenticated by the authentication component and obtain the user authentication information for one or more of the enterprise applications from the password management application, the password management client further uses the obtained user authentication information to access the one or more enterprise applications.

2. The password management system of claim 1, wherein the authentication component is a centralized authentication software component.

3. The password management system of claim 1, further including a switch component operable to load balance between at least the web server and a second web server, the switch component selects and wherein the switch component communicates with the web servers using a secure socket layer.

4. The password management system of claim 1, further comprising a plurality of distributed web browser component object model program components and wherein the password management client includes a plurality of scripts operable to request user security information of one of the enterprise applications from the password management application and to use the user security information to logon to one or more of the enterprise applications, the plurality of distributed web browser component object model program components operable to trigger execution of one of the scripts.

5. The password management system of claim 1, wherein the application server is a platform independent service oriented architecture application server.

6. The password management system of claim 1, further including:
    a cached application security data store operable to store the user security information including user identities and user passwords, and wherein the cached application security data store is operable to periodically receive updates from the application security data store;
    an alternate authentication component operable to authenticate a request for web services;

an alternate web server accessed through an alternate universal reference locator, to authenticate the request for web services through communication with the alternate authentication component, to forward the request for the user security information, and to return the user security information; and an alternate application server operable to receive the request for the user security information from the alternate web server, to retrieve the user security information from the cached application security data store, and to return the user security information to the alternate web server.

7. The password management system of claim 1, further including:
a remote agent resident on a remote desktop computer;
a plurality of access servers responsive to the remote agent on the second desktop computer; and
a plurality of scripts on each of the access servers, the scripts operable to request the user security information from the web server, and wherein the plurality of enterprise applications are accessible via the access servers such that the plurality of scripts on the access servers are operable to employ the user security information to logon to the enterprise applications.

8. The password management system of claim 7, wherein the enterprise applications are resident on each of the access servers.

9. The password management system of claim 7, wherein the remote agent is further defined as a remote client, and wherein the access servers are further defined as remote servers.

10. The password management system of claim 7, wherein at least one fat client is resident on the desktop computer to access one of the enterprise applications.

11. A method for logging into enterprise applications from a computer, comprising:
logging into a password management system including a web server using a single sign-on login information;
authenticating, with an authentication component in communication with the web server, the single sign-on login information to access a password management application executing on an application server;
requesting login information for one of the enterprise applications from the password management application, wherein at least two of the enterprise applications have a unique login information with respect to a user such that the login information for the user for a first one of the at least two of the enterprise applications is different from the login information for the user for a second one of the at least two of the enterprise applications;
retrieving, by the password management application, the login information from a data store;
providing the retrieved login information to a password management client executing on the computer; and
using, by the password management client, the retrieved login information to log into at least one of the enterprise applications.

12. The method of claim 11, further including:
providing the login information associated with each of a plurality of enterprise applications; and
storing the login information associated with each of a plurality of enterprise applications in the data store.

13. The method of claim 11, wherein on a first logging into the password management system the method further includes:
loading a plurality of distributed web browser component object model program components and a plurality of scripts onto the computer, each distributed web browser component object model program component associated with a user interface and operable to invoke at least one of the scripts associated with one of the enterprise applications, and wherein each script is operable to communicate with a password management back end to request and receive login information for at least one of the enterprise applications and to use the login information to login to the enterprise application associated with the script.

14. The method of claim 13, further including loading one or more updated distributed web browser component object model program components.

15. The method of claim 13, further including loading one or more updated scripts.

16. The method of claim 13, wherein the distributed web browser component object model program components and scripts are transmitted from the password management system to the computer in the form of a file and wherein the file contains the distributed web browser component object model program components and scripts in compressed format.

17. The method of claim 16, wherein the file is a cabinet file or a .jar file.

18. The method of claim 11, further including:
detecting that the enterprise application requires a changed password;
generating the changed password;
using the changed password to log into the enterprise application; and
after successfully logging into the enterprise application, storing the changed password in the data store.

19. A method for logging into an enterprise application from a computer, comprising:
attempting to log into a password management system including a first server;
receiving an out of service message from the password management system;
logging into a backup password management system including a second server using a single sign-on login information;
authenticating, with an authentication component in communication with the second server, the single sign-on login information to access a password management application executing on an application server;
retrieving, by the password management application, a unique login information with respect to a user for at least two of a plurality of enterprise applications from a data store in the backup password management system such that the login information for the user for a first one of the at least two enterprise applications is different from the login information for the user for a second one of the at least two enterprise applications and wherein the unique login information is different from the single sign-on login information;
providing the retrieved unique login information for the at least two enterprise applications in clear text to the computer;
using the retrieved unique login information to log into one or more of the enterprise applications from the computer.

20. The method of claim 19, further including periodically copying login information from the password management system to the data store in the backup password management system.

21. A method for logging into enterprise applications from computers local and remote to an enterprise using a single sign-on, the method comprising:
- using a single sign-on information from the remote computer to log into a server communicating with a web server of the enterprise;
- authenticating the single sign-on information received from the remote computer and security information to access the enterprise;
- requesting login information that is unique relative to the single sign-on information for at least one enterprise application such that the login information is different from the single sign-on information for the at least one enterprise application;
- retrieving the enterprise application login information from a data store;
- using the enterprise application login information to log into at least one of the enterprise applications by the remote computer;
- using the single sign-on information from the local computer to log into the web server;
- authenticating the single sign-on information received from the local computer to access the enterprise; and
- using the enterprise application login information to log into at least one of the enterprise applications by the local computer.

22. The method of claim 21, wherein the authenticating of the single sign-on information involves employing a centralized authentication software package.

23. The method of claim 22, wherein the authenticating of the single sign-on information from the remote computer involves the web server validating single sign-on information using tokens presented when requesting the enterprise application login information and involves the web server presenting a proxy user identity and a proxy user password to the centralized authentication software package to authenticate the requestor.

24. The method of claim 23, wherein the tokens include one or more types of information selected from the group consisting of a user identity, a domain of the enterprise application, a hash value calculated on a script employed in requesting the login information, and an internet protocol address of the remote server.

25. The method of claim 24, wherein the hash value is calculated on the script using the MD5 secure hashing algorithm.

26. The method of claim 21, wherein the security information is further defined as an internet protocol address of the server, a hash value of a script on the server, and an logon information provided by a user of the remote computer.

27. The method of claim 26, wherein using the enterprise application login information to log into one or more of the enterprise applications further comprises:
- detecting, by the script, a display window of the enterprise application requesting login information; and
- automatically completing, by the script, the display window login information requested by the enterprise application to access the enterprise application.

\* \* \* \* \*

UNITED STATES PATENT AND TRADEMARK OFFICE
CERTIFICATE OF CORRECTION

PATENT NO. : 7,636,852 B1  
APPLICATION NO. : 10/960535  
DATED : December 22, 2009  
INVENTOR(S) : Balasubramanian et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Ninth Day of November, 2010

David J. Kappos
*Director of the United States Patent and Trademark Office*